Sept. 27, 1932.　　　R. A. STOUGAARD　　　1,879,581

EXHAUST GAS CONVEYER

Filed June 10, 1931

Inventor
ROY A. STOUGAARD.

By　Milton Tibbitts
　　　　　Attorney

Patented Sept. 27, 1932

1,879,581

UNITED STATES PATENT OFFICE

ROY A. STOUGAARD, OF DETROIT, MICHIGAN, ASSIGNOR TO PACKARD MOTOR CAR COMPANY, OF DETROIT, MICHIGAN, A CORPORATION OF MICHIGAN

EXHAUST GAS CONVEYER

Application filed June 10, 1931. Serial No. 543,422.

This invention relates to motor vehicles and more particularly to a system for disposing of engine exhaust gases within a garage.

In many instances it is the practice to allow the engine of a motor vehicle to operate while repairs or adjustments are being made thereon in a garage. While this greatly aids, and on numerous occasions is essential to, the proper adjustment of the engine, the ill effects upon the persons in the garage, caused by monoxide gas, are well known. In many States it is required that these exhaust gases be removed from public garages and several methods of accomplishing this result have come into use; however, none of them have been entirely satisfactory. The most commonly used method utilizes flexible tubing for connecting the exhaust pipe of the motor vehicle with an underground conduit leading out of the building, but the disadvantages found with flexible tube connections are that they become filled with carbon and are frequently run over by motor vehicles and bent out of shape.

It is a general object of the present invention to provide an improved and novel exhaust removal system for garages.

Another object of the invention is to provide a rugged extension member between the exhaust pipe of a motor vehicle and an underground conduit in a garage, which can be readily attached and removed.

A further object of the invention resides in a durable unitary extension connecting member consisting of a plurality of movable sections connected so that interposition can readily be made between the exhaust pipe of a motor vehicle and a ground conduit system leading externally from the garage.

Other objects of the invention will appear from the following description taken in connection with the drawing, which forms a part of this specification, and in which.

Figure 1:
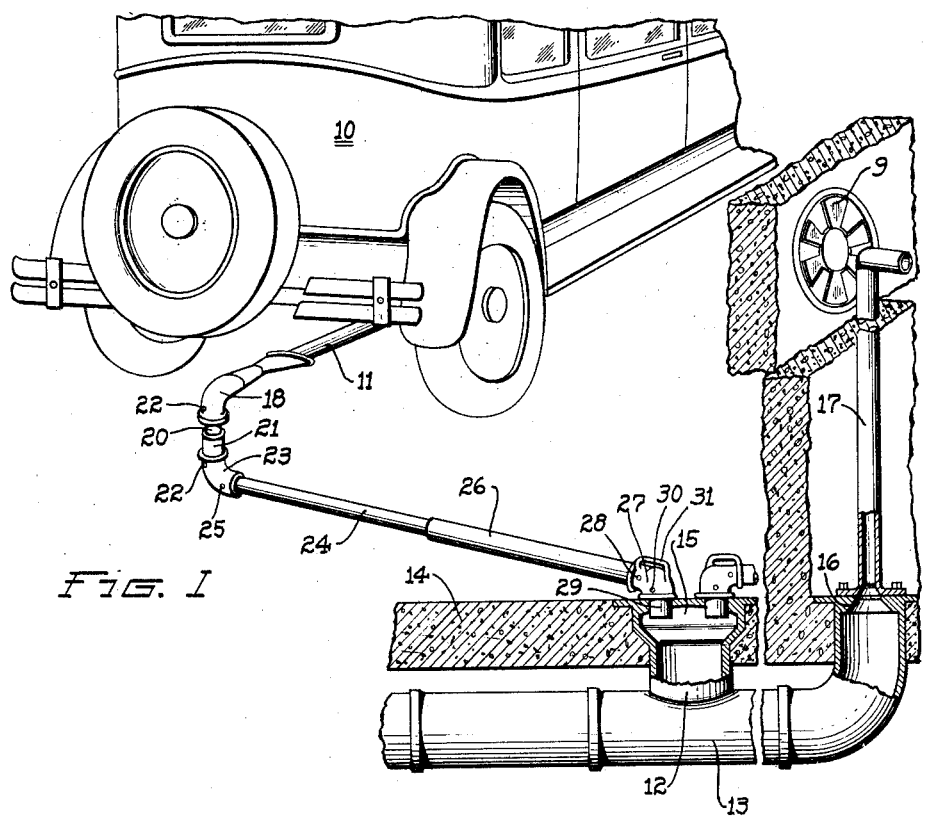
Fig. 1 is a fragmentary perspectve view partly in section, illustrating the invention.
Figure 2:
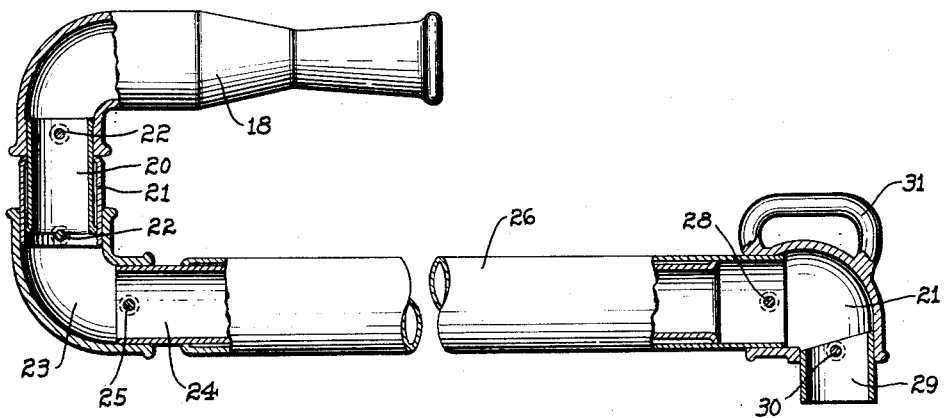
Fig. 2 is an enlarged elevational view of the connecting member having portions broken away to show its jointed construction.

Referring now to the drawing by characters of reference, 10 represents a motor vehicle from which an engine exhaust pipe 11 extends in the conventional manner. Beneath the floor 14 of a garage is arranged an exhaust outlet conduit 13 having a plurality of inlet branches 12 leading through the floor and terminating in floor plates 15 having one or more openings therethrough. The underground conduit has a ground level outlet 16 to which is connected an upwardly extending conduit 17 from the open end of which exhaust gases are expelled by the aid of a fan 9.

Between the motor vehicle exhaust pipe and the conduit branches I propose to interpose a flexible connecting member which can be readily applied or removed, and which is of a rugged construction such that it can withstand the abuse of use in a garage. Such connecting member comprises a plurality of telescopically arranged pipe sections which include an elbow 18 having one end formed to provide a coupling which can be slipped over the outlet end of the exhaust pipe. A pipe section 20 extends into the other end of the elbow and is secured thereto by rivets 22, and telescoping the pipe section 20 is another pipe section 21 which extends into an end of the elbow section 23 and is secured thereto by rivets 22. The section 20 is formed with an outturned end flange which is adapted to engage an inturned flange on the telescoping end of the section 21 to prevent axial displacement of the sections relatively. A pipe section 24 is secured in the other end of the elbow section 23 and is fixed thereto by rivets 25. Telescoping the section 24 is another pipe section 26 which fits into one end of an elbow 27 and is secured to the elbow by rivets 28. The telescoping end of the section 26 has an inturned end flange which cooperates with an outturned end flange on the sleeve 24 to prevent axial displacement of such sections relatively. Pipe section 29 fits into the other end of the elbow 27 and is secured thereto by rivets 30. Upon the elbow 27 is formed a hand grip 31 by means of which the entire connecting unit can be readily handled.

The sections 20 and 21 are rotatably related and can also be adjusted axially so that an extensible and rotatable connection between the elbows 18 and 23 is thus provided. The sections 24 and 26 are also relatively rotatable and extensible in an axial direction so that such adjustment can be made between the elbows 23 and 27. It will thus be seen that the connecting member can be adjusted in a plurality of directions so that its attachment to the exhaust pipe of vehicles, arranged in different relations to the conduit inlets, can be readily provided for through the extension or rotation of the sections relatively. The connecting member, being formed of either cast or forged metal pipe sections, is of a durable character and will withstand the abuses to which it is subjected in garages, for instance, such as being run over by motor vehicles. When a vehicle is located with its exhaust pipe anywhere within the vicinity of one of the conduit inlets 12, the connecting section 29 is inserted into an opening in the floor plate, if it is already not so located, and the sections are then adjusted either by extension, rotation or both so that the elbow 18 can be slipped over the end of the exhaust pipe. Suitable closures (not shown) can be provided for the openings in the floor plates when the connecting members are detached to prevent escape of exhaust from the conduit 13 to the interior of the garage.

With the device shown, a durable connection can be readily made between a vehicle and the exhaust conduit and the attachment thereof will prevent any engine exhaust from entering the interior of the garage.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a system for disposing of engine exhaust gases in a garage, the combination with an outlet conduit and an engine exhaust pipe, of a connection comprised of a plurality of rigid sections, some of said sections being adjustably related.

2. In a system for disposing of engine exhaust gases in a garage, the combination with an underground conduit and an engine exhaust pipe, of a readily applied connecting member between the exhaust pipe and the conduit comprising a plurality of pipe sections, the ends of adjacent sections being telescoped.

3. In a system for disposing of engine exhaust gases in a garage, the combination with an outlet conduit and an engine exhaust pipe, of a connecting member adapted to connect the exhaust pipe with the conduit comprising associated pipe sections some of which are adjustable axially in two directions and relatively rotatable.

4. In a system for disposing of engine exhaust gases in a garage, the combination with an outlet conduit and an engine exhaust pipe, of a connection member composed of permanently associated pipe sections adjustable axially and rotatably, the end sections being in the form of elbows.

5. In a system for disposing of engine exhaust gases in a garage, the combination with an outlet conduit and an engine exhaust pipe, of a flexible connecting member comprising an outlet section swivelably connected to the outlet conduit, a central section extensibly and rotatably connected to the outlet section, and an inlet section extensibly and rotatably connected to the central section, said inlet section being formed to telescopically engage the exhaust pipe of an engine.

In testimony whereof I affix my signature.

ROY A. STOUGAARD.